United States Patent [19]
Ryon

[11] 3,724,673
[45] Apr. 3, 1973

[54] TEXTURED MEMBRANES FOR BLOOD DIALYZERS OXYGENATORS AND THE LIKE

[75] Inventor: David M. Ryon, Scotia, N.Y.
[73] Assignee: General Electric Company
[22] Filed: Aug. 28, 1970
[21] Appl. No.: 67,753

[52] U.S. Cl. .................. 210/500, 23/258.5, 264/92
[51] Int. Cl. ............................................ B01d 31/00
[58] Field of Search ....55/16, 158; 23/258.5; 210/22, 210/23, 321, 500; 264/48, 92, 321

[56] References Cited

UNITED STATES PATENTS 3,026,231   3/1962   Chavannes ....................... 264/92 X

OTHER PUBLICATIONS

Peirce II, "A New Concept In Membrane Support for Artificial Lungs", from Trans. Amer. Soc. Artif. Int. Organs, Vol. XII, June 10, 1966, pages 334–339.
Peirce II, et al., "The Membrane Lung: Studies with a New High Permeability Co-Polymer Membrane", from Trans. Amer. Soc. Artif. Int. Organs, Vol. XIV, June 14, 1968, pages 220–226.

Primary Examiner—Frank A. Spear, Jr.
Attorney—Jon Carl Gealow, Arthur V. Puccini, Frank L. Neuhauser, Oscar B. Waddell and Joseph B. Forman

[57] ABSTRACT

A myriad of small undulations or projections are formed permanently in a thin membrane to give it a textured surface. The membrane may be permselective for use in fluid exchange devices such as blood oxygenators and artificial kidneys or dialyzers. When such membranes are superposed on each other, a thin film of blood or other fluid flowing between them is gently agitated by the textured surface to enhance the absorption of a gas such as oxygen which is transported through the membrane. The textured surface prevents adjacent membrane layers from adhering. The textured surface is created by heating, vacuum forming and cooling on a suitable die.

9 Claims, 6 Drawing Figures

PATENTED APR 3 1973 3,724,673
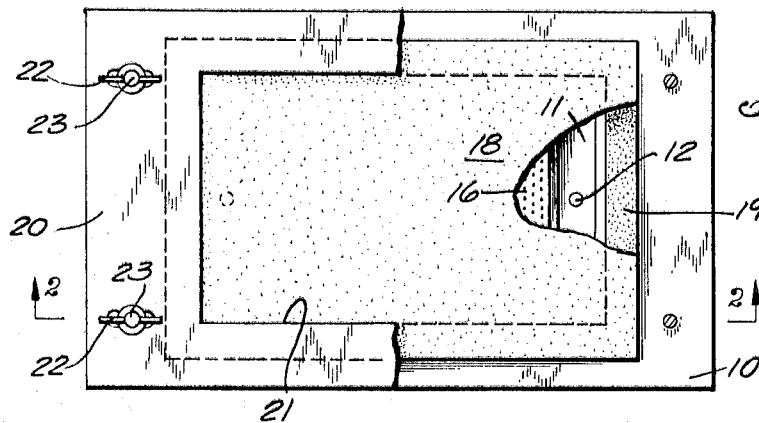
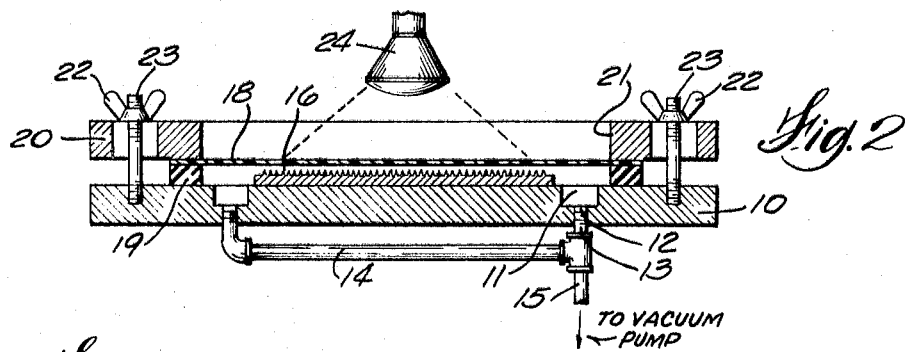
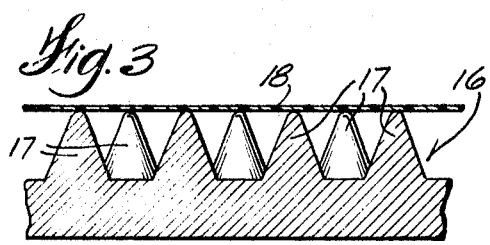
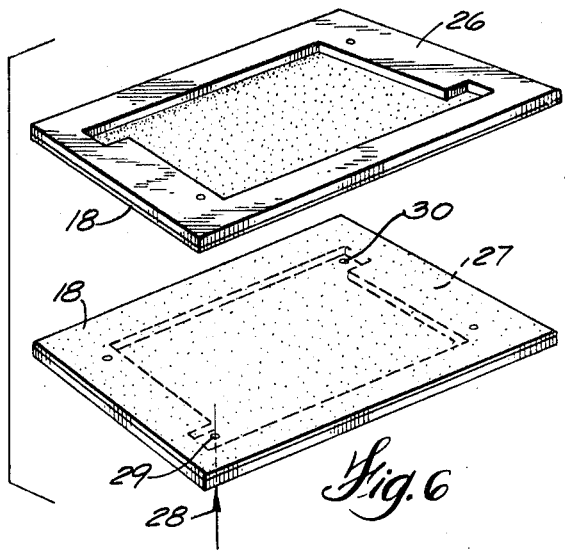
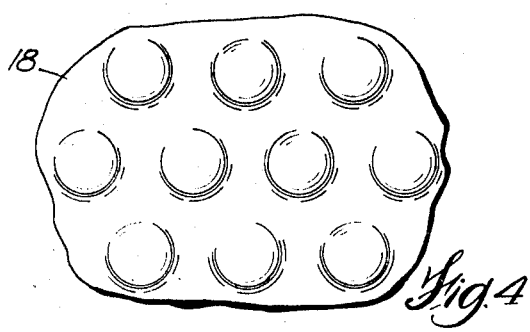
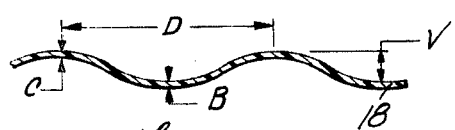
Inventor
David M. Ryon
By Wiviott & Hohenfeldt
Attorneys

TEXTURED MEMBRANES FOR BLOOD DIALYZERS OXYGENATORS AND THE LIKE

BACKGROUND OF THE INVENTION

The present invention is applicable to various life sustaining fluid exchange devices but it will be discussed primarily in relation to membrane type blood oxygenators. Such oxygenators comprise pairs of membranes which are superposed on each other so that a thin film of blood may flow between them. The outside surfaces of the membranes are exposed to a stream of oxygen enriched gas in which case oxygen is transported through the membrane to the blood and carbon dioxide is transported from the blood through the membrane to the gas. This method of extracorporeal blood gas exchange through membranes is rapidly becoming dominant over methods which involve direct contact between gas and blood.

It is known that oxygen is absorbed more efficiently in a thin film of blood if there is some turbulence created in the blood by gentle agitation. Several methods of agitating blood have been proposed and used. One involves backing the non-confronting surfaces of the membranes with rigid separators or spacers in which there are a multiplicity of capillary grooves. Blood pressure between the membranes then distends them into the grooves and creates corresponding capillary paths between the membranes which agitate the blood and supposedly develop non-preferential blood flow paths.

Another method used is to back the outsides of the membranes with rigid separators which have a field of small cones projecting from them. The membranes then deform into the spaces between the cones and assume a configuration which aids in gently agitating the blood film.

Another among the various methods of deforming the membrane surfaces which are in contact with the blood involves casting a fluid polymer on a fabric mesh or screen in which case the interstices of the mesh are closed by a thin film of a cured polymer. The fibers of the mesh or screen are, of course, also coated and they stand out in relief from the membrane and give it a texture surface.

The foregoing and other known methods of creating surface deformations on the blood contacting sides of the membranes have some serious disadvantages. For instance, the effective clear membrane surface is diminished as a result of being in contact with a rigid separator regardless of whether the separator has a field of small cones or a multiplicity of capillary grooves. Oxygen transfer to the blood and carbon dioxide transfer from the blood cannot occur where the membrane is being contacted and the oxygenator must be made larger to compensate. When a fabric is embedded in the membrane, it should also be obvious that effective gas transfer area will be reduced.

Another problem that has been encountered in prior membrane type blood oxygenators is that the membranes tend to cohere when they are stacked prior to use or when they are superposed on each other in a blood oxygenator assembly. This is especially true of membranes which are inherently tacky, such as in the case of dimethyl silicone membranes. It should be apparent that cohered patches will interfere with the flow of the blood film and reduce the effective gas transfer area of the membranes. To minimize cohesion, some prior blood oxygenator membranes are surface treated with substances that must be flushed out before the oxygenator is put into use. This is a time consuming process in a case where time is of the essence. Moreover, there is no certainty that cohesion will not reoccur before or during use of the oxygenator.

It has also been proposed to form small cones directly on the membrane surface to prevent cohesion. This has been done by casting the membrane on a die plate which has the desired pattern engraved in it. The intent was prevent cohesion by having the cone field extend from opposite membranes and establish a multiplicity of point contacts. However, when a cone field is cast as an integral part of the membrane, the membrane is thickened to the extent of the cone height and it thereby transports gas less efficiently in the region of the cones. Moreover, casting a membrane in this manner is a time consuming process for it usually takes about 1 hour to perform.

A primary object of the present invention is to overcome the aforementioned and other disadvantages found in prior membrane applications by providing a membrane which has permanent plastically deformed texture imparted to its surface so as to prevent cohesion between membranes and yet not undergo any reduction in oxygen transport capability.

A further object is to provide a method for making a permanently textured membrane.

Briefly stated, the new membrane has a multiplicity of small cross sectional deformations or undulations which for the sake of brevity will be called cones hereafter. The cones are plastically deformed in the membrane surface by localized bending and stretching in which case the cone regions are actually thinner than the parent membrane on which they are formed. The term cones as used herein in connection with the membrane and the die on which it is textured is intended to embrace regular cones as well as other forms of sharp and blunt points or projections such as pyramids and cylinders. In the case of the die the term even includes the converse of projections, such as holes.

The method of forming the cones or fine undulations constituting a texture includes the step of placing a smooth membrane over a die on which a field of cones stands out in relief and then evacuating the space between the die and membrane so that air pressure may deform the latter in correspondence with the cone pattern. Heat is applied shortly after evacuation is initiated and is discontinued before evacuation is terminated so that upon cooling the plastically deformed cones will remain in the membrane.

How the foregoing object and other more specific objects are achieved will appear from time to time throughout the course of the ensuing description of an illustrative embodiment of the invention taken in conjunction with the drawing.

DESCRIPTION OF THE DRAWING

FIG. 1 is a plan view of a device for forming the new membrane with parts being broken away to show the internal construction;

FIG. 2 is a vertical cross-section taken on the line corresponding with 2—2 in FIG. 1;

FIG. 3 is a magnified cross-sectional fragment of a typical die for forming a textured membrane together with a membrane as it appears prior to being textured;

FIG. 4 is a top view of a fragment of a die and a transparent membrane showing the staggered distribution of the die cones;

FIG. 5 is a magnified cross-section of a small part of a membrane which has been textured; and FIG. 6 shows a pair of membrane supporting frames such as are used in a blood oxygenator.

DESCRIPTION OF A PREFERRED EMBODIMENT

Apparatus for vacuum forming a textured membrane is shown symbolically in FIGS. 1 and 2. The apparatus comprises a vacuum table base 10 in which there is a rectangular channel 11. There may be several air evacuation holes such as 12 in the bottom of the channel as can be seen in FIG. 1. In FIG. 2 it is apparent that short pipes 13 thread into holes 12 and connect with a header 14. By a suitable conduit 15, the header connects to a vacuum pump, not shown.

A typical die for forming the membrane is shown in cross-section in FIG. 2 and is marked 16. As can be seen in an enlargement of a fragment of the die 16 in FIG. 3, the upper surface of the die has a myriad of small cones 17. These cones are staggered from row to row as can be seen in FIG. 4. An undeformed membrane 18 is shown bearing on the tops of the cones in FIG. 3.

In FIG. 2 one may see that the membrane 18 has its margins bearing on a gasket 19. The membrane forms a vacuum tight seal with gasket 19 by virtue of pressure being applied to the membrane by means of a clamping frame 20. The clamping frame is rectangular in form and has a central window opening 21. A clamping force may be applied to frame 20 by any suitable means such as tightening wing nuts 22 on studs 23 which are threaded into vacuum table base 10 as can be seen in FIG. 2.

Forming textured membrane 18 with the apparatus shown in FIGS. 1 and 2 involves depositing a smooth sheet of membrane on the gasket 19 and then sealing it with clamping frame 20. The membrane is then preheated by any suitable heat source such as heating lamp 24. After several seconds of heating, a valve, not shown, in the vacuum pump line is opened and a vacuum is created in the space underneath membrane 18. Atmospheric air pressure acting through window 21, then forces the membrane down onto the field of cone 17 which project upwardly from the top of die 16, thus forming small deformations in the membrane. Heat source 24 is then turned off and the plastically deformed membrane 18 is allowed to cool and set. After another short interval, the evacuated space under membrane 18 is restored to atmospheric pressure and the permanently textured membrane may be removed by unclamping frame 20.

The depth of the valleys which are formed in membrane 18 by reason of the membrane being subjected to pressure and heat depends on several factors including the pressure differential between the atmosphere and the evacuated space, the membrane temperature, and the thickness and plastic flow characteristics of the membrane material. Valley depth may also be influenced by the sharpness and height of the die cones.

A membrane which has been textured for use in blood oxygenators and that will be useful for demonstrating some of the parameters of the texturing process in a particular case is an organopolysiloxane polycarbonate block copolymer which is described in U.S. Pat. No. 3,189,622 of the General Electric Co. Membrane made of this polymer is commercially available from General Electric Co., under the designation MEM 213. A 2 mil thick piece of this membrane was clamped and sealed as in FIGS. 1 and 2 and heated for about 15 seconds to a temperature in the vicinity of 140° F. At the end of 15 seconds evacuation of the space underneath membrane 18 was initiated and continued until a negative pressure of 25 inches of mercury was developed. Under the influence of atmospheric pressure, the membrane became textured. Heating was continued for a total of 1¾ minutes and the vacuum was relieved 15 seconds later or at the end of 2 minutes. Membranes of different materials and thicknesses would, of course, require selection of appropriate pressures, temperatures and heating and cooling cycles.

The die 16 used was one of which the height of cones 17 was about 30 mils. The center-to-center spacing of the cones approximated 40 mils. The base diameter of the cones was about 20 mils. A membrane formed on this die under the conditions described above was cross-sectioned and examined under a microscope. The initial thickness of the membrane film was 0.002 inch ± 0.0003 inch before vacuum forming. Characteristics of the membrane will be described in connection with FIG. 5 which shows a section thereof. The distance D between crests measured 42 mils. The valley depth V was about 9.4 mils. Thickness of the membrane at its crests C was about 1.4 mils. The thickness at the bottoms of the valleys B was 1.7 mils. The 0.6 mil reduction in thickness at the crests and the 0.3 mil reduction of thickness at the bottoms of the valleys showed that the membrane had been permanently plastically deformed by bending and stretching during the texturing process. The reduction in thickness is an important feature of the invention since it results in increased gas permeability and an oxygenator of reduced size. This thickness reduction is in contrast with the prior art where cones were molded on the parent membrane thus increasing the thickness of the membrane over much of the total area and actually reducing gas permeability at the expense of minimizing cohesion and providing a multiplicity of capillary paths.

Note in FIG. 5 that the crests and valley are connected as smooth curves in all lateral directions. If the cones 17 on the die are made short enough and pressure and temperature are suitably adjusted, it is possible to deform the membrane sufficiently to develop flat bottomed valleys in the interspace between cones. As shown, however, the undulations are symmetrical with respect to the lateral mid-plane.

One use of the new textured membrane is demonstrated in the co-pending joint application of the inventor herein entitled "BLOOD COMPONENT EXCHANGE DEVICE", filed July 2, 1970, Ser. No. 51,829, now U.S. Pat. No. 3,864,097, which is assigned to the assignee of the present invention. The use is typified in FIG. 6 of the drawing in the present application. This figure shows a pair of open centered rectangular frames 26 and 27. Frame 26 has a textured membrane 18 adhered to its bottom surface. Frame 27 has a textured membrane 18 adhered to its top surface. In a blood oxygenator, the frames are stacked on each other with their membranes confronting to define a thin blood film flow space between them. The superposed and compressed frames 26 and 27 constitute a blood envelope. A number of such envelopes may be stacked to form an oxygenator of desired capacity. In a typical case, blood comes from the bottom of frame 27 as indicated by the arrow 28 and flows over the top of membrane 18 on frame 27 by entering through an entrance port 29 and exiting downwardly from a port 30. The cited co-pending application shows how slotted inserts are pressed into the ports to depress the membranes so blood will be directed between them. Oxygen flows over the top of membrane 18 associated with frame 26 and over the bottom of the membrane associated with frame 27. The projecting formed cones on the adjacent textured membranes interdigitate with each other, thereby enhancing agitation of the blood film as it flows between the membranes. This improves oxygen absorption by the blood. Although the membranes may be stretched quite tightly across their frames, they are adequately elastic for distending normal to their planes to permit formation of a blood film of appropriate thickness.

The die 16 used to illustrate the invention has spaced apart cones with open space between them to permit deformation of the membrane. A die of converse configuration can also be used to obtain essentially the same results. For example, either a die plate with many small holes or a suitably thick screen can be used. External air pressure will, nevertheless, press the membrane into the holes or the interstices of the screen where permanent deformation can occur. The results of the invention are obtainable even if the cones or undulations project from one surface of the membrane only provided the sides with the cones are used in confronting relation with each other.

In summary, a method has been described for texturing a thin membrane that is adapted for use in blood oxygenators and the like. The membrane is characterized by a multiplicity of plastically deformed crests and valleys at which the membrane thickness is less than that of the parent undeformed membrane. The total surface area of the textured membrane is greater than that of the undeformed original membrane so as to augment the improved gas transport that results from reduction in thickness. The texturing method may be applied to any suitable, thin, thermoplastic membrane material. Although typical examples of the new textured membrane and method of making the same have been described, it will be understood that such descriptions are illustrative rather than exclusive, for the invention may be variously embodied and is to be limited only by interpretation of the claims which follow.

I claim:

1. A thin textured membrane for use in fluid exchange devices such as blood oxygenators and dialyzers, comprising:
   a. a film comprised of thermoplastic material having a myriad of thermoplastically formed deformations in which the film which defines and deformations respectively, is at least in part thinner than the film between said deformations.

2. The membrane defined in claim 1 wherein:
   a. the film deformations constitute crest and valley regions which are mutually confluent with each other, said crest regions being the thinner parts and said valley regions being the thicker parts of said film.

3. The invention defined in claim 1 wherein:
   a. said membrane consists of an organopolysiloxane polycarbonate block copolymer material.

4. The invention defined in claim 1 wherein:
   a. the distance between the centers of the crest and valley regions is about 42 mils.

5. The invention defined in claim 1 wherein:
   a. the distance between the top of said crest regions and the bottom of the valley regions is about 10 mils.

6. A method of texturing a thin thermoplastic membrane comprising the steps of:
   a. sealing a thermoplastic membrane with one of its surfaces exposed to a space for gas and another confronting an imperforate forming die which has a myriad of uniformly spaced apart open regions presented toward the membrane,
   b. establishing a pressure difference between gas in said space and the space between the die and the confronting membrane while heating it so that ambient gas pressure distends regions of the membrane thermoplastically into the open regions of the die until at least a part of said distended regions is thinner than the original membrane, and then
   c. discontinuing the application of heat and cooling the membrane for an interval followed by discontinuing said pressure difference, whereupon plastic deformations in the membrane formed in the open regions are permanently set.

7. The method set forth in claim 6 as specifically applied to texturing a membrane consisting of organopolysiloxane polycarbonate block copolymer in which:
   a. said membrane is heated to a temperature in the vicinity of 140°F.

8. The method set forth in claim 6 wherein:
   a. the forming die used has its spaced apart open regions defined by laterally spaced apart cones projecting toward the membrane.

9. A thin textured membrane for use in fluid exchange devices such as blood oxygenators and dialyzers, comprising:
   a. a film comprised of thermoplastic material having a substantially uniform original thickness an having a myriad of adjacent thermoplastically formed deformations which constitute projections in respect to one side of said film and which constitute recesses corresponding with the projections, respectively, with respect to the other side of said film, the film between said deformations being closer to said original thickness and the film defining said deformations individually having at least a part which is thinner than said original thickness.

* * * * *